(12) United States Patent
Minowa et al.

(10) Patent No.: US 6,440,036 B2
(45) Date of Patent: Aug. 27, 2002

(54) POWER TRANSMISSION APPARATUS FOR AN AUTOMOBILE

(75) Inventors: Toshimichi Minowa, Mito; Ryoso Masaki, Hitachi; Toshiyuki Innami, Tsuchiura; Yuzo Kadomukai, Ishioka, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/842,980

(22) Filed: Apr. 27, 2001

Related U.S. Application Data

(63) Continuation of application No. 09/576,819, filed on May 24, 2000, now Pat. No. 6,328,670, which is a continuation of application No. 09/300,519, filed on Apr. 28, 1999, now Pat. No. 6,142,907.

(30) Foreign Application Priority Data

Apr. 28, 1998 (JP) .......................... 10-118175

(51) Int. Cl.[7] .............................. B60K 41/02
(52) U.S. Cl. ...................................... 477/5
(58) Field of Search ............... 477/5, 6, 8, 13; 475/5; 180/65.2, 65.3, 654

(56) References Cited

U.S. PATENT DOCUMENTS

| 1,992,210 | A | * | 2/1935 | Higley | 172/239 |
|---|---|---|---|---|---|
| 2,790,337 | A | * | 4/1957 | Zelewsky et al. | 74/665 |
| 2,924,991 | A | * | 2/1960 | Whiting | 74/675 |
| 3,205,965 | A | | 9/1965 | Roth | 180/65 |
| 3,478,851 | A | * | 11/1969 | Smeth et al. | 477/5 X |
| 4,335,429 | A | * | 6/1982 | Kawakatsu | 180/65 A |
| 4,533,011 | A | * | 8/1985 | Heidemeyer et al. | 180/65.2 |
| 4,664,217 | A | * | 5/1987 | Welch et al. | 477/5 X |
| 5,337,848 | A | * | 8/1994 | Bader | 477/5 X |
| 5,346,031 | A | * | 9/1994 | Gardner | 180/65.2 X |
| 5,489,001 | A | * | 2/1996 | Yang | 180/65.2 |
| 5,562,566 | A | * | 10/1996 | Yang | 475/5 X |
| 5,603,671 | A | * | 2/1997 | Schmidt | 475/5 |
| 5,730,675 | A | | 3/1998 | Yamaguchi | 475/2 |
| 5,735,767 | A | * | 4/1998 | Forsyth | 475/269 |
| 5,775,449 | A | * | 7/1998 | Moroto et al. | 477/5 X |
| 5,943,918 | A | * | 8/1999 | Reed, Jr. et al. | 192/219.5 X |

FOREIGN PATENT DOCUMENTS

| DE | 44 44 545 | 6/1995 |
|---|---|---|
| JP | 50-30223 | 3/1975 |
| JP | 8-98322 | 4/1996 |

OTHER PUBLICATIONS

"Micromachined Accelerometer" (Preliminary Information), Motorola Semiconductor Technical Data, pp. 2–112 to 2–114.

* cited by examiner

Primary Examiner—Rodney H. Bonck
Assistant Examiner—Roger Pang
(74) Attorney, Agent, or Firm—Crowell & Moring LLP

(57) ABSTRACT

Disclosed is a power transmission apparatus for an automobile comprising an engine 1, a generator 15 driven by an output of the engine 1, and a motor 29 driven by a generation output of the generator 15 and a discharge output of a battery 47, wherein a clutch mechanism 23 is provided between an output shaft of the engine 1 and an output shaft of the generator 15. In a hybrid vehicle, a loss caused by an inertia torque of the generator can be avoided.

4 Claims, 11 Drawing Sheets

F I G. 1
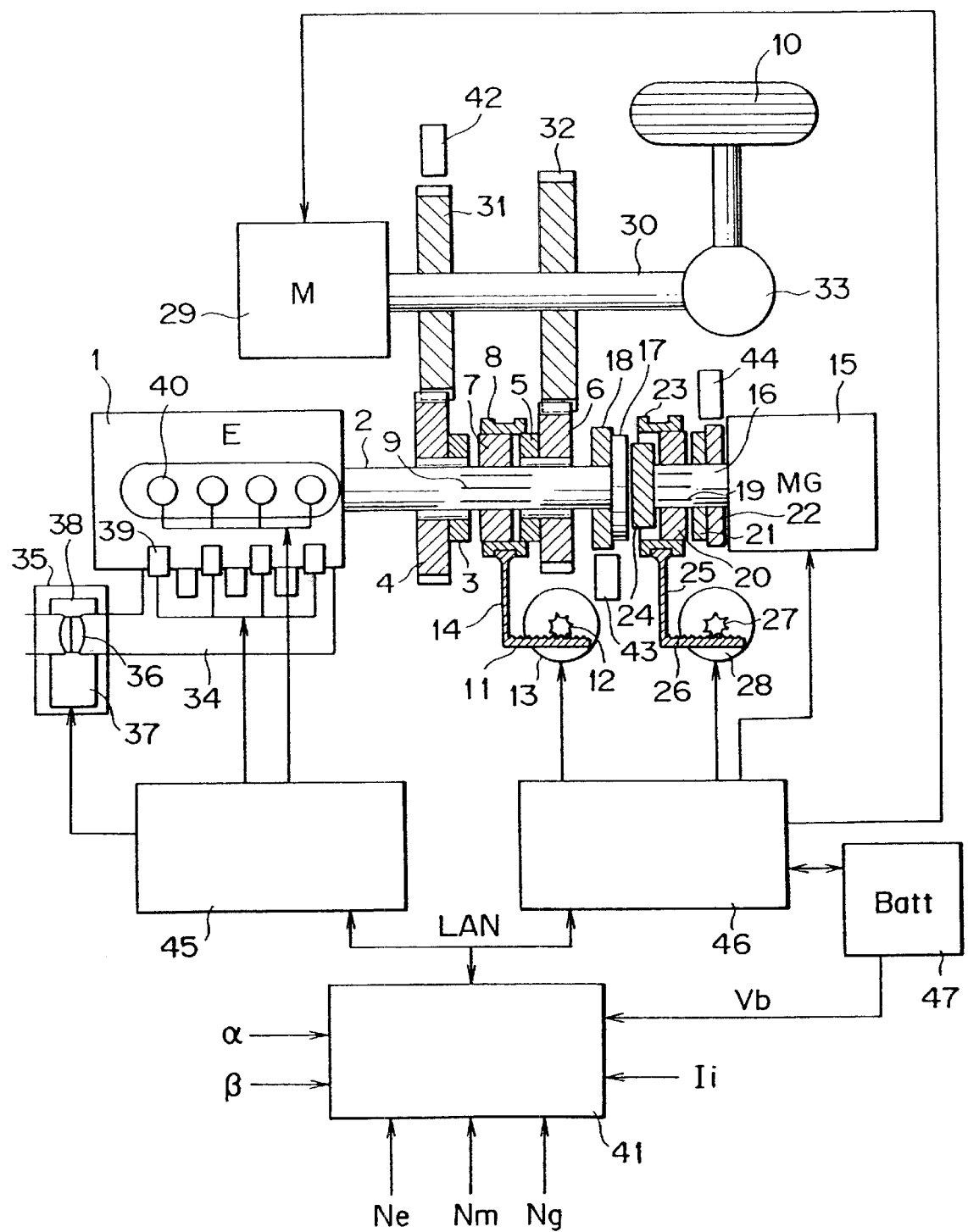

F I G. 5
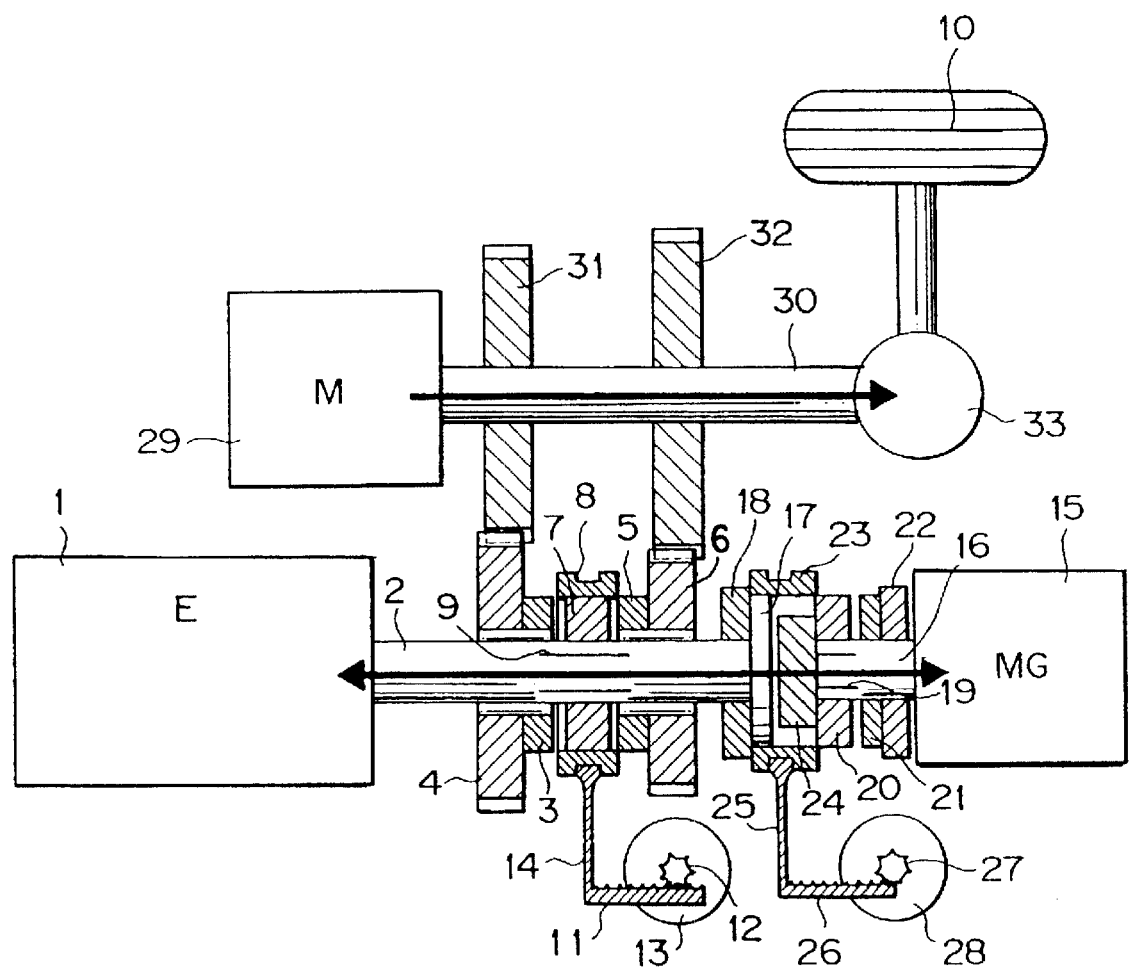

F I G. 12
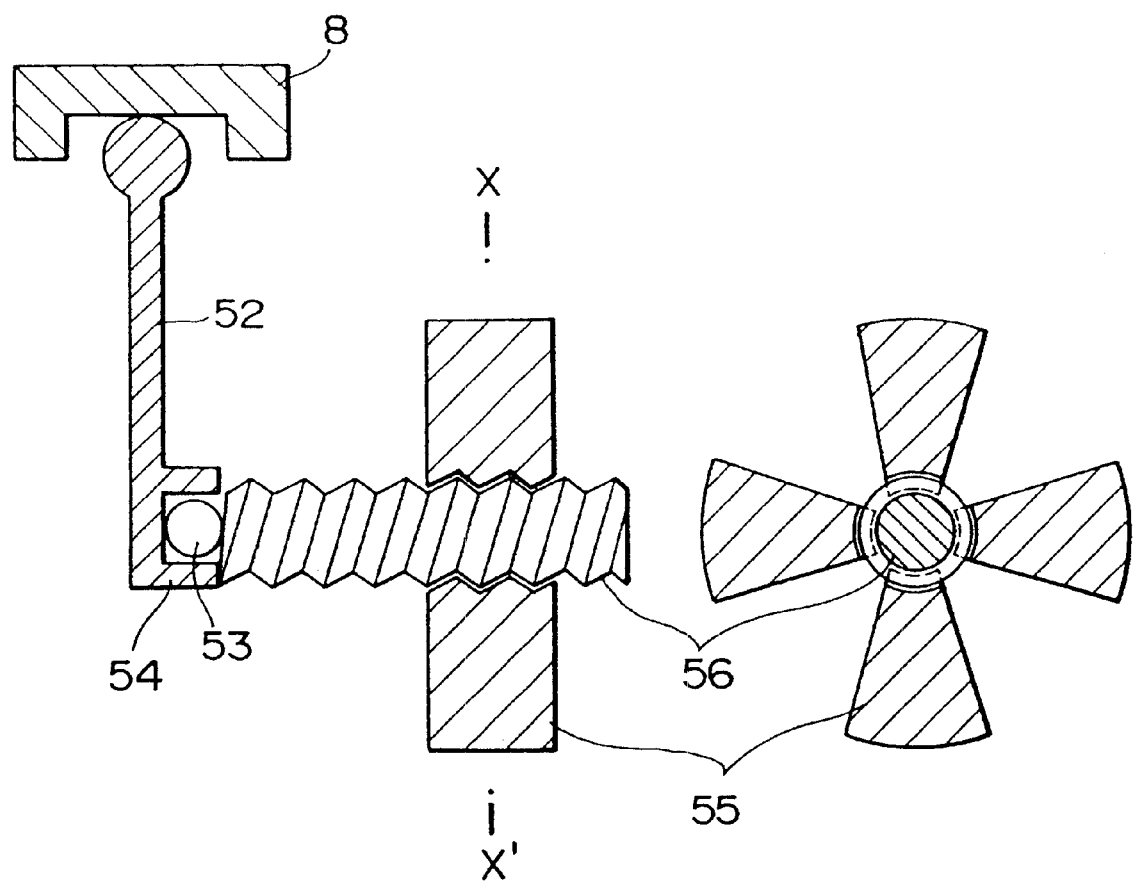

POWER TRANSMISSION APPARATUS FOR AN AUTOMOBILE

This application is a continuation of application Ser. No. 09/576,819, filed May 24, 2000, issued Dec. 12, 2001 as U.S. Pat. No. 6,328,670; which was a continuation of application Ser. No. 09/300,519 filed Apr. 28, 1999, issued Nov. 7, 2000 as U.S. Pat. No. 6,142,907.

BACKGROUND OF THE INVENTION

The present invention relates to a construction of a power train system comprising an internal combustion engine (hereinafter referred to as an engine), an electric power device (hereinafter referred to as a motor) and a power transmission apparatus, and particularly to a power transmission apparatus adapted to enhance the transmission efficiency of the power train system.

Japanese Patent Laid-Open No. Hei 8-98322 discloses a known example using a power transmission apparatus adapted to enhance the transmission efficiency of the power train system.

In the above publication, there is described a power train construction in which an engine and a generator are connected to each other through a speed increasing gear, and a torque from an output shaft of the generator is transmitted to a motor through a clutch. In the above-described power train construction, since the generator and the motor permit high accuracy adjustment of the number of revolutions of the output shaft, torque variation at the time of switching between a series mode and a parallel mode (series mode: running by only the motor using energy generated by the engine; parallel mode: running by the engine and the motor) caused by engagement and disengagement of the clutch can be suppressed.

It is necessary for the above-described system to synthetically control the engine, the motor and the generator so that an operator (a driver) may operate the engine and the motor in a high efficiency region while satisfying acceleration and deceleration required by an operator. Therefore, a constitution is provided in which the engine is connected to the generator, and a torque from the output shaft of the generator is transmitted to the motor through the clutch.

With this constitution, in the case where the vehicle is intended to be accelerated in the state in which the clutch is engaged (the parallel mode), an inertia torque of a generator rotating portion occurs, and it is necessary to correct a torque corresponding to the inertia torque by the engine or the motor. Thus, it is impossible to avoid an increase in fuel consumption due to the inertia torque.

SUMMARY OF THE INVENTION

In view of the foregoing, it is an object of the present invention, in the case where the aforementioned parallel mode operation is employed and charging of a battery is not necessary, to suppress the generation of the inertia torque thereby improving fuel economy of the vehicle.

For achieving the aforementioned object, there is provided a power transmission apparatus for an automobile comprising an engine, a generator driven by an output of the engine, a battery charged by a generation output of the generator, and a motor driven by a discharge output of the battery, wherein a clutch mechanism is provided between an output shaft of the engine and an output shaft of the generator.

Preferably, the clutch mechanism is a device which requires no energy for engagement and disengagement when it is engaged or disengaged.

Preferably, the clutch of the clutch mechanism is a dog clutch.

Preferably, there is used a clutch mechanism using a linear actuator (e.g. a motor, a gear and a rack) for driving the dog clutch.

BRIEF DESCRIPTION OF THE DRAWINGS

FIG. 1 shows a constitutional view of a hybrid automobile system according to one embodiment of the present invention;

FIG. 5 shows a system constitutional view in a series mode of FIG. 1;

FIG. 12 shows one example of a wobble motor applied to a linear actuator of FIG. 1.

DESCRIPTION OF THE PREFERRED EMBODIMENTS

Figure 2:
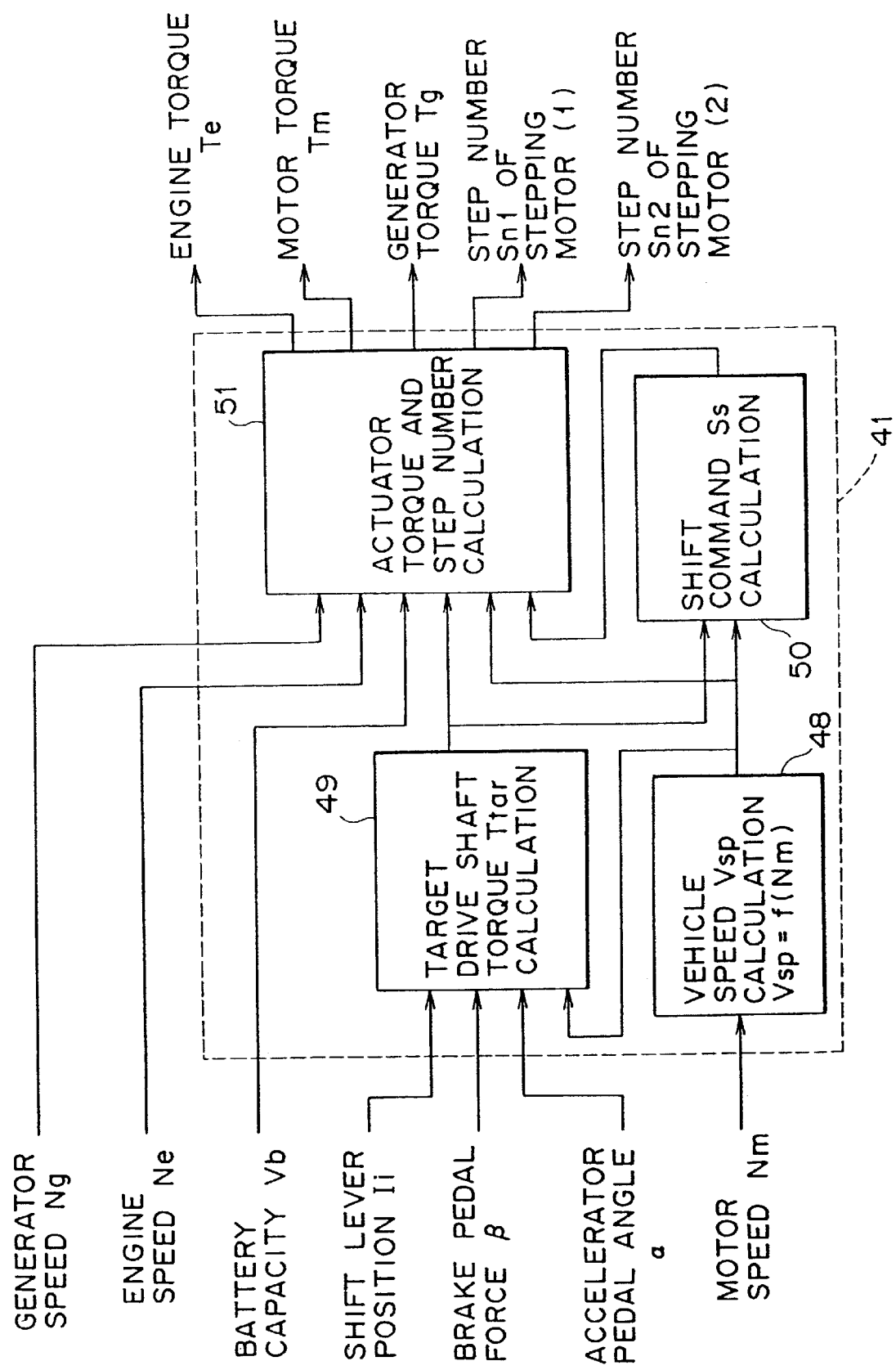
FIG. 2 shows a control block diagram of FIG. 1.

The embodiments according to the present invention will be described in detail hereinafter with reference to the drawings.

FIG. 1 shows a construction of a hybrid automobile system according to one embodiment of the present invention. In the system shown in FIG. 1, an output shaft 2 of an engine 1 has a gear 4 on the engine side for low speed having a meshing gear 3, a gear 6 on the engine side for high speed having a meshing gear 5, a hub 7 and a sleeve 8 for directly connecting the gear 4 on the engine side for low speed or the gear 6 on the engine side for high speed with the output shaft 2. A stopper (not shown) is provided so that the gear 4 on the engine side for low speed and the gear 6 on the engine side for high speed may not move in an axial direction of the output shaft 2. The hub 7 is internally provided with grooves (not shown) engaged with a plurality of grooves 9 of the output shaft 2. The hub 7 is movable in an axial direction of the output shaft 2, but the movement of the hub 7 in a rotational direction of the output shaft 2 is limited. Thereby, the torque output from the engine 1 is transmitted to the hub and the sleeve. In order to transmit the torque from the engine 1 to the gear 4 on the engine side for low speed or the gear 6 on the engine side for high speed, it is necessary to move the sleeve 8 in an axial direction of the output shaft 2 to directly connect the meshing gear 3 or 5 to the hub 7. The meshing gears 3 and 5 and the hub 7 are provided with the same grooves, and the sleeve 8 is internally provided with a groove (not shown) engaged with the sleeve 7. For movement of the sleeve 8, there is provided a linear actuator comprising a rack 11, a pinion 12 engaged with the rack 11, and a stepping motor (1) 13. The outer peripheral portion of the sleeve 8 is made free in the rotational direction of the output shaft 2, and a lever 14 is provided which is not rotated with respect to the rotation of the sleeve 8. The clutch mechanism comprising the hub 7, the sleeve 8, the meshing gear 3 and the meshing gear 5 is called a dog clutch. This mechanism enables the transmission of energy from a power source such as the engine 1 to a tire 10 with high efficiency to improve fuel economy. Since the stepping motor (1) 13 can recognize the rotational angle by the number of steps preset, a moving position of the rack 11 can be judged. It is therefore possible to judge whether or not the gear 4 on the engine side for low speed or the gear 6 on the engine side for high speed is used at present, or the position is in a neutral position. The above-described judgement can be made by a combination of a sensor for detecting a position of the rack and a DC motor in place of the stepping motor.

The above-described clutch mechanism and the linear actuator are also applied to the direct connection between the output shaft 2 of the engine 1 and an output shaft 16 of a generator 15. The output shaft 2 is provided with a gear 18 for detecting the engine speed Ne of the engine 1 having a meshing gear 17 rotated integrally with the output shaft 2. Further, the output shaft 16 is provided with a gear 22 for detecting the speed Ng of the generator 15 having a meshing gear 21 and a hub 20 movable along a groove 19 in the axial direction of the output shaft 16. A sleeve 23 is provided in the outer periphery of the hub 20. Further, a thrust bearing 24 is provided between the output shaft 2 and the output shaft 16 to reduce the frictional resistance caused by the contact between the two output shafts and prevent a deviation of the shaft. The linear actuator portion is composed of a lever 25, a rack 26, a pinion 27 and a stepping motor (2) 28.

An output shaft 30 of a motor 29 for driving a vehicle (not shown) is provided with a gear 31 on the motor side for low speed meshed with the gear 4 on the engine side for low speed and a gear 32 on the motor side for high speed meshed with the gear 6 on the engine side for high speed. The gear 31 on the motor side for low speed is also used for detecting the speed Nm of the motor 29. Further, the output shaft 30 is provided with a final differential gear 33 to enable the running of the vehicle by only the motor 29.

In the engine 1, the intake airflow rate is controlled by an electronically controlled throttle 35 (comprising a throttle valve 36, a driving motor 37 and a throttle sensor 38) provided on an intake manifold 34 so that the fuel flow rate corresponding to the intake airflow rate is ejected from fuel injectors 39. The igniting timing is determined from signals of the air/fuel ratio, the engine speed and so on determined from the airflow rate and the fuel flow rate, and ignition is made by an ignitor 40. The fuel injectors 39 include an intake port injection system in which fuel is injected to an intake port, or a direct injection system in which fuel is injected directly into a cylinder. Preferably, operating regions required by the engine (regions determined by the engine torque and the engine speed) are compared to select an engine of the system which can improve fuel economy and has the excellent exhaust performance.

Next, the control device for the engine 1, the generator 15 and the motor 29 will be explained with reference to FIG. 2, a control block diagram, FIG. 3, a target drive shaft torque characteristic, and FIG. 4, a shift command characteristic. First, into a power train control unit 41 of FIG. 1 are input an accelerator pedal angle α, a brake pedal force β, a shift lever position Ii, a battery capacity Vb, the speed Nm of the motor 29 detected by a motor speed detector 42, the engine speed Ne detected by an engine speed detector 43, and the generator speed Ng detected by a generator speed detector 44. In the power train unit 41, torque of the engine 1 is calculated, and transmitted to an engine control unit 45 by LAN as communication means. Within the engine control unit 45, an opening degree of a throttle valve for achieving the engine torque, the fuel flow rate and the ignition timing are calculated, and their respective actuators are controlled. Further, in the power train control unit 41, the torques of the motor 29 and the generator 15, and the number of steps of the stepping motor (1) 13 and the stepping motor (2) 28 are calculated, and transmitted to the motor control unit 46 by LAN so that the actuators therefor are controlled. The motor control unit 46 allows to charge electric power obtained from the generator 15 in a battery 47 and supply power from the battery 47 to drive the motor 29 and the like. Referring to FIG. 2, in the power train control unit 41, first, the vehicle speed Vsp is calculated by the function f from the motor speed Nm in the process 48. Then, in the process 49, the target drive shaft torque Ttar intended by an operator is calculated from the vehicle speed Vsp, the accelerator pedal angle α, the brake pedal force β, and the shift lever position Ii. In the process 50, a shift command Ss is calculated from the target drive shaft torque Ttar and the vehicle speed Vsp to select the gear 3 for low speed or the gear 6 for high speed. Finally, in the process 51, torques of the actuators (an engine torque Te, a motor torque Tm and a generator torque Tg), a step number Sn1 of the stepping motor (1), and a step number Sn2 of the stepping motor (2) are calculated from the target drive shaft torque Ttar, the vehicle speed Vsp, the battery capacity Vb, the engine speed Ne and the generator speed Ng, and output.

Figure 3:
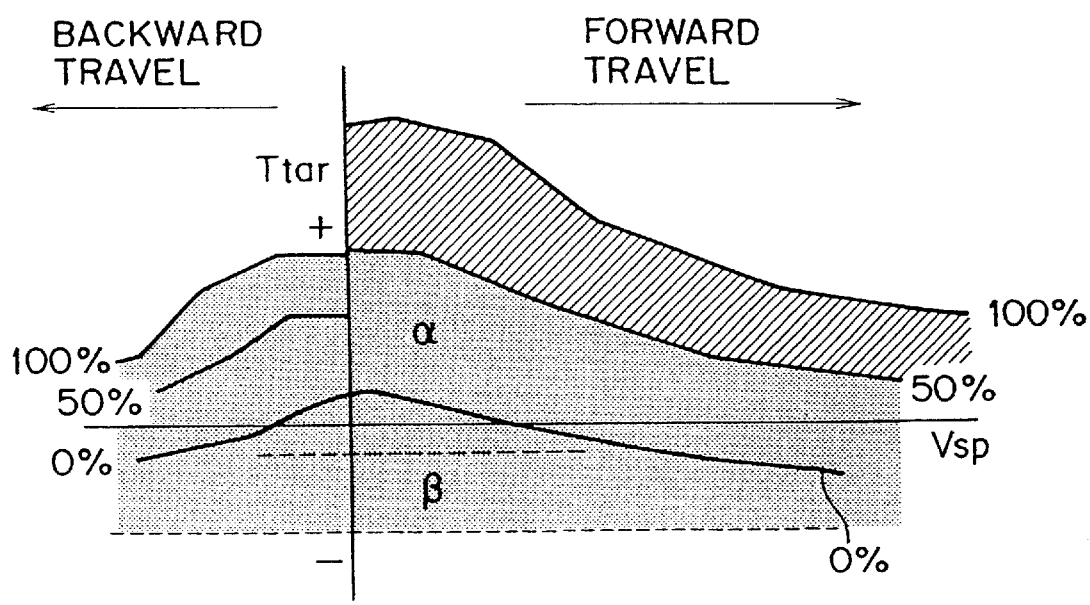
FIG. 3 shows the target torque characteristics of a drive shaft of FIG. 1.

In FIG. 3, the axis of abscissa indicates the vehicle speed Vsp, and the axis of ordinate indicates the target drive shaft torque Ttar. A portion above a point of intersection of the two axes represents that the drive torque is positive, while a portion below represents that the drive torque is negative. A portion on the right hand of the point of intersection represents a forward travel, while a portion on the left hand represents a backward travel. The solid line indicates the accelerator pedal angle α (%), and the diagonal line indicates the brake pedal force β. The larger % of the accelerator pedal angle α, the larger the target drive shaft torque Ttar because an operator demands a great acceleration feeling. In case of the backward travel, since the vehicle speed need not be increased, the target drive shaft torque is small. The brake pedal force β shows a high value in the lower part in FIG. 3, it indicates that an operator demands a great deceleration. In the low vehicle speed at which the accelerator pedal angle α is 0%, the target drive torque is positive to generate the torque of the motor 29 so as to simulate the generation of the maximum torque at stall speed using a torque converter.

Next, the applied operating regions of the engine 1 and the motor 29 will be explained. The mesh region is a motor driving region, and the diagonal region is an engine driving region. Normally, in a region where the target drive shaft torque Ttar is small at the time of the forward travel and the backward travel in terms of the compact and light weight of the engine 1 and the motor 2 and the improvement in fuel economy resulting from the high efficiency operation, it is necessary to drive only the motor 1. Further, in the case where the target drive shaft torque Ttar is negative, the revival operation of the motor 1 is executed to make the deceleration demanded by an operator and the improvement in fuel economy by recovery of energy compatible.

Figure 4:
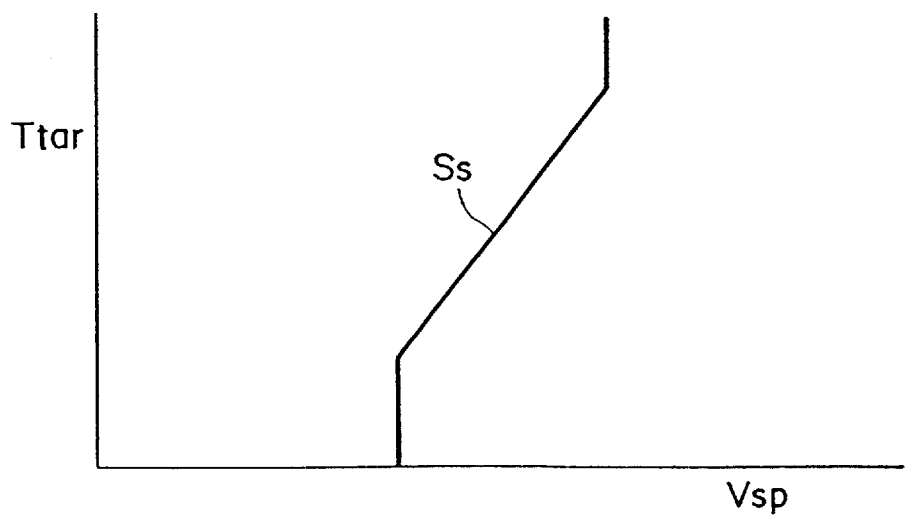
FIG. 4 shows shift command characteristics of FIG. 1.

FIG. 4 shows the shift command Ss characteristics of a shift mechanism using the dog clutch for making the operation region of the engine 1 and the motor 29 highly efficient.

In FIG. 4, the shift command Ss is determined by the vehicle speed Vsp and the target drive shaft torque Ttar. In the shift command Ss, the value in which the engine 1 and the motor 29 has the maximum efficiency in the overall operation region is obtained in advance by the experiment or simulation and stored in memory means (not shown) within the power train control unit 41.

Figure 8:
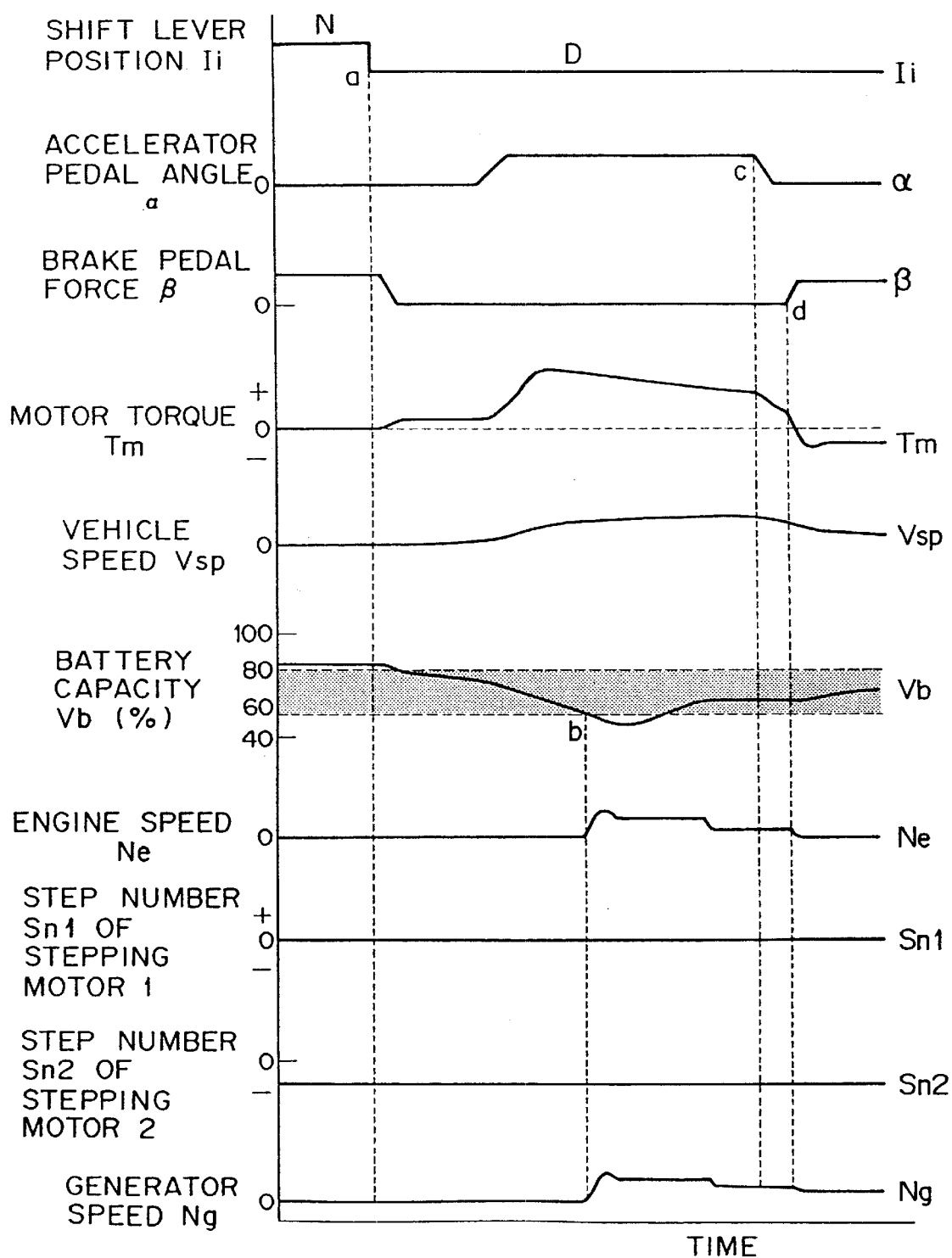
FIG. 8 shows a time chart at the time of operation in a series mode of FIG. 1.
Figure 9:
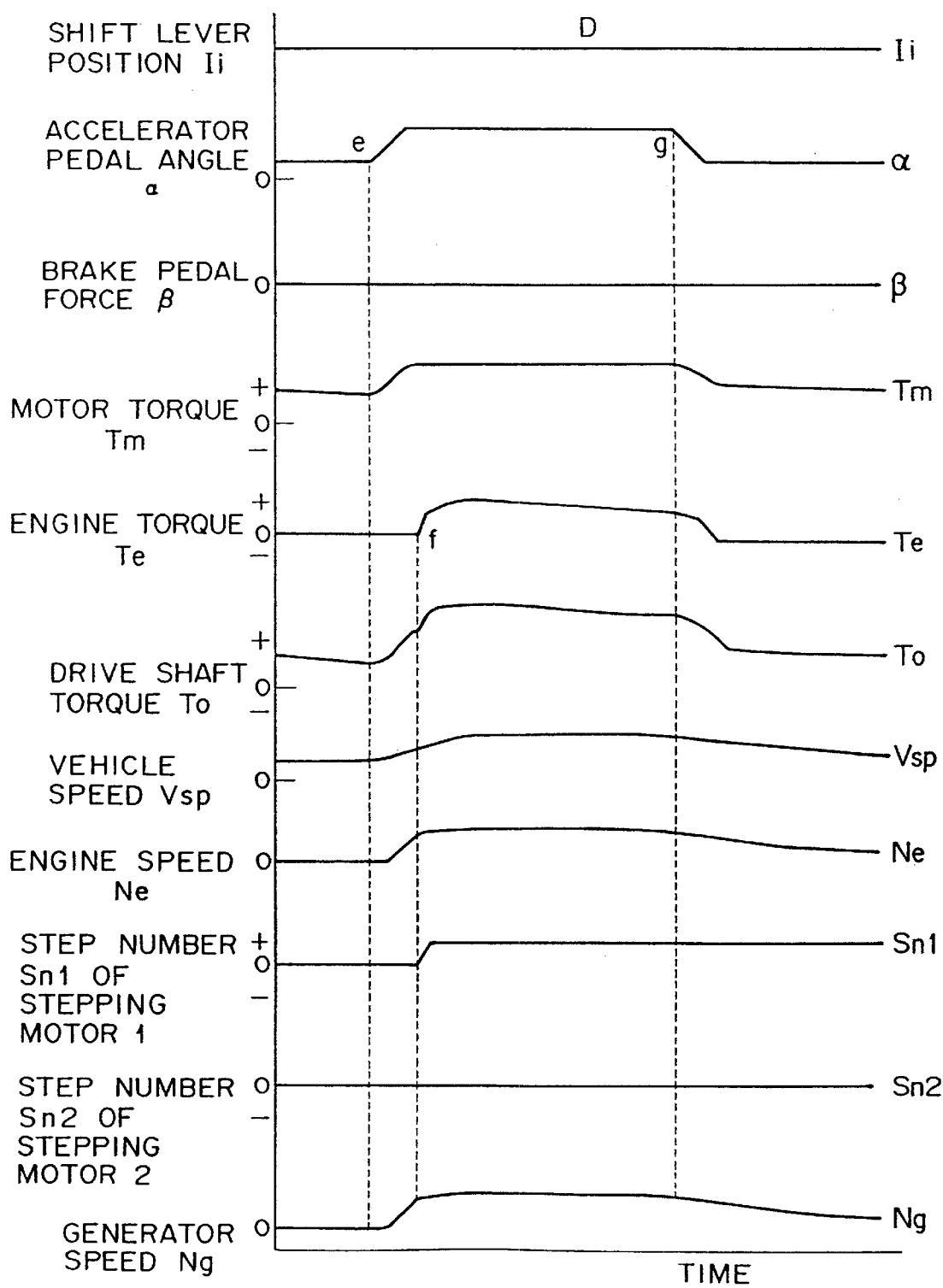
FIG. 9 shows a time chart at the time of operation in a parallel mode of FIG. 1.
Figure 10:
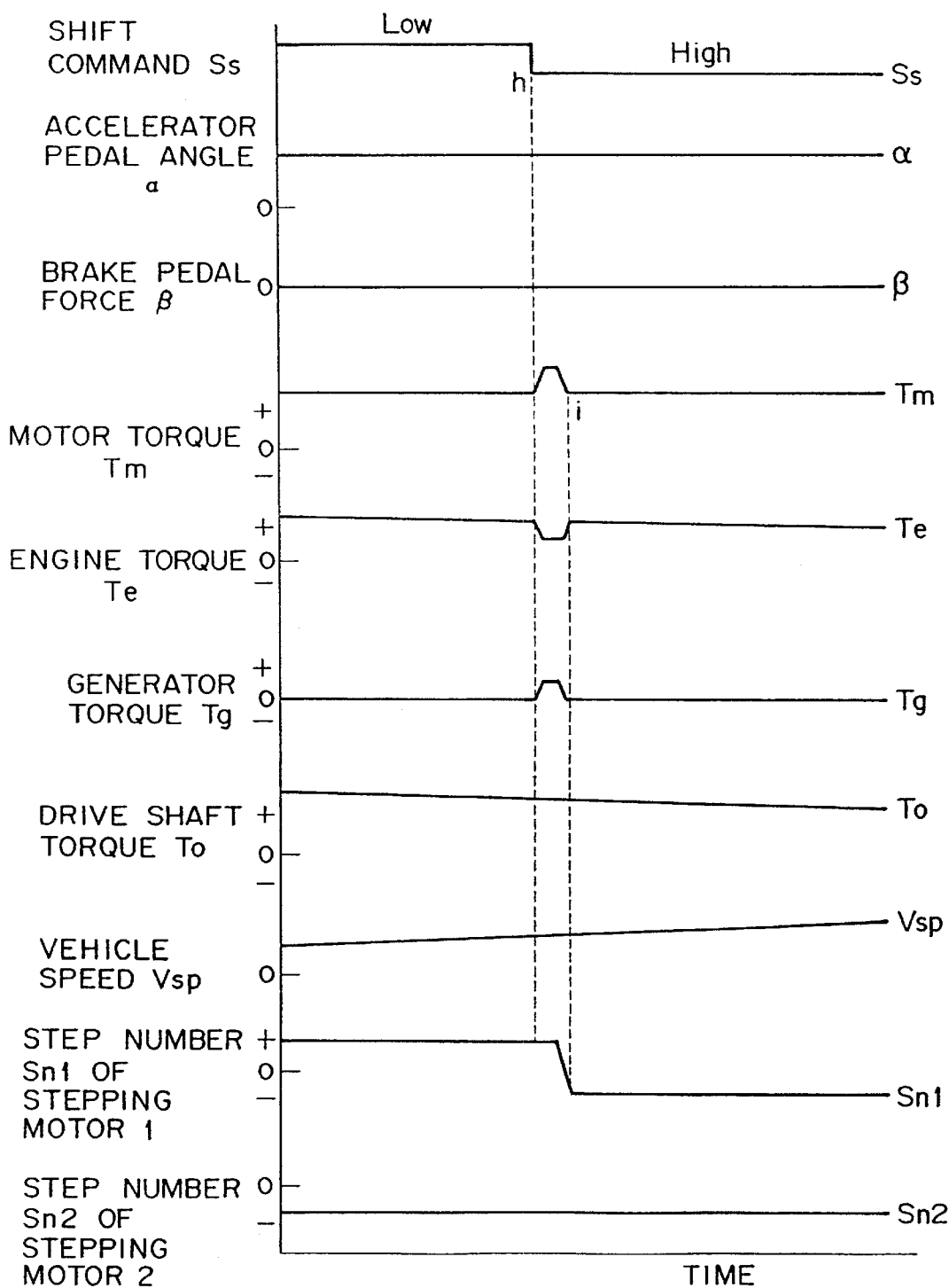
FIG. 10 shows a time chart at the time of switching a shift mechanism of FIG. 1.

The operation principle of the system constitution shown in FIG. 1 will be explained with reference to FIGS. 5 to 10. FIG. 5 shows the system constitution in a series mode, FIG. 6 shows the system constitution in a parallel mode at the time of low speed, FIG. 7 shows the system constitution in a parallel mode at the time of high speed, FIG. 8 is a time chart at the time of operation in a series mode, FIG. 9 is a time chart at the time of operation in a parallel mode, and FIG. 10 is a time chart at the time of switching a shift mechanism.

In FIG. 5, the series mode termed herein is an operation in which the generator 15 is driven by the engine 1, and the motor 29 is driven by power charged in the battery 47 to run the vehicle. In this case, the stepping motor (1) 13 is rotated rightward, the rack 11 is moved leftward, and the sleeve 8 is set to a neutral position. Further, the stepping motor (2) 28 is rotated rightward, the rack 26 is moved leftward, and the sleeve 23 is set to the meshing gear 17 mounted on the output shaft 2 of the engine 1. Thereby, the engine 1 drives only the generator 15 to enable charging the battery 47. Further, the generator 15 can be operated also as a motor, and the engine 1 is started by the generator 15. Next, one example of the running of the system shown in FIG. 5 will be explained with reference to FIG. 8. In FIG. 8, the axis of abscissa indicates the time, and the axis of ordinate indicates the shift lever position Ii, the accelerator pedal angle α, the brake pedal force β, the motor torque Tm, the vehicle speed Vsp, the battery capacity Vb, the engine speed Ne, step number Sn1 of the stepping motor (1), step number Sn2 of the stepping motor (2), and the generator speed Ng. The running conditions are the case where the vehicle starts from its stop state, and the accelerator pedal angle α is changed during running. An operator applies a brake in the state where the shift lever position is N (neutral), and therefore, the vehicle stops. The battery capacity is also in a state requiring no charge. When the battery capacity exceeds 75%, the efficiency lowers, and when it is not more than 50%, the voltage drop is great to lower discharge power. It is therefore desirable that charging of the battery 47 is executed in the mesh portion shown in FIG. 8. After the shift lever position has been moved (a) to D (drive: forward) from N (neutral), the motor torque Tm is determined according to the accelerator pedal angle α. Immediately after N to D shift (a), since the accelerator pedal angle α, is 0% and the vehicle is in a low speed, the motor torque Tm is positive by the maximum torque at stall rotation, so that the vehicle starts to run. Thereafter, the battery capacity Vb is reduced by the use of the motor 29. At the time (b) when the battery capacity Vb is lower than 50%, the generator 15 is used as a motor to start the engine 1. Thereafter, the generator 15 is used as a generator and charging is executed by the torque of the engine 1. In the case where an operator sets the accelerator pedal angle α to 0% (c) and applies a brake (d), the revival is executed by the motor 29 to charge the battery.

Figure 6:
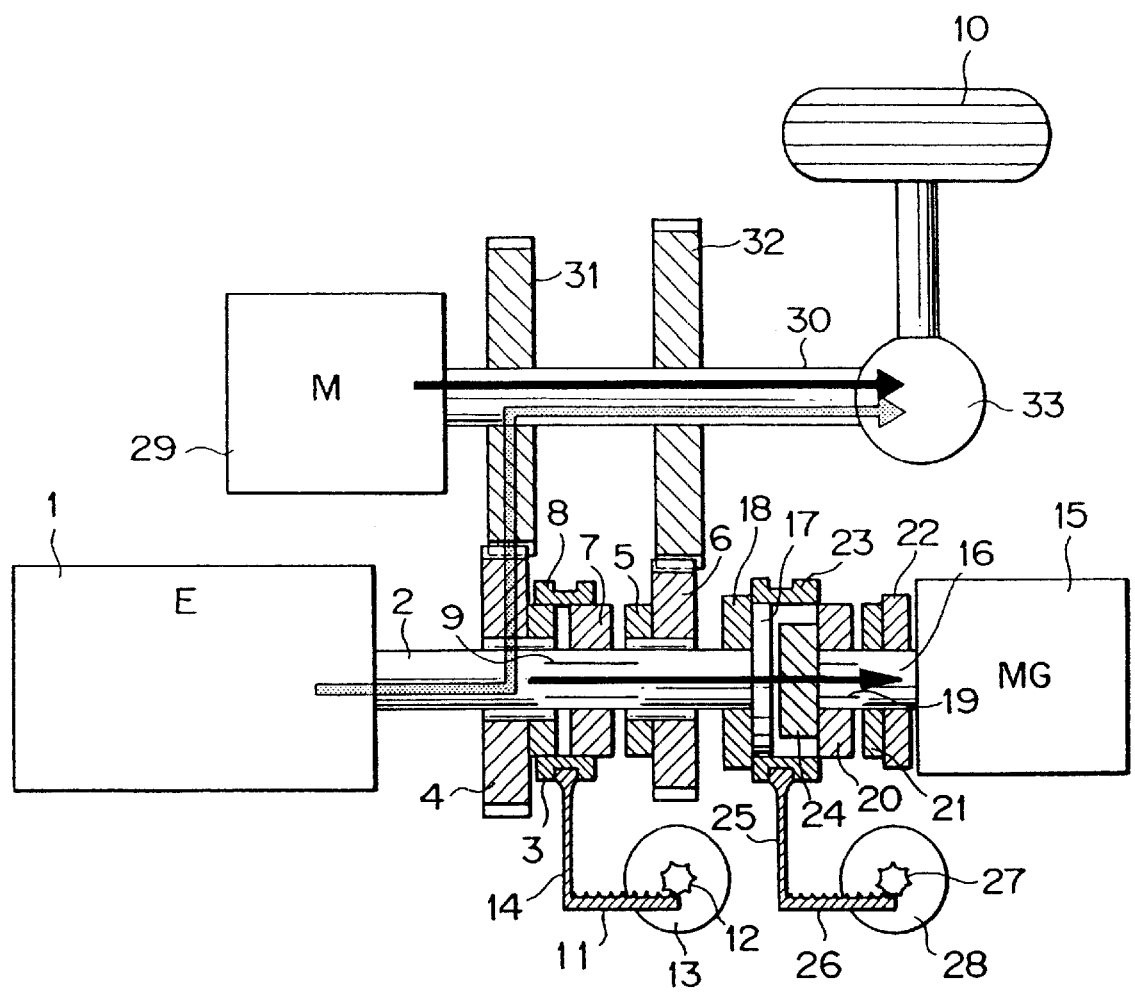
FIG. 6 shows a system constitutional view in a parallel mode at low speed of FIG. 1.

In FIG. 6, the parallel mode termed is an operation in which the generator 15 is driven by the engine 1, the motor 29 is driven by power charged in the battery 47 to run the vehicle and at the same time the torque of the engine 1 is applied to drive the vehicle. In this case, the stepping motor (1) 13 is rotated rightward, the rack 11 is moved leftward, and the sleeve 8 is set to the meshing gear 3 provided on the gear 4 on the engine side for low speed. Further, the stepping motor (2) 28 is rotated rightward, the rack 26 is moved leftward, and the sleeve 23 is set to the meshing gear 17 provided on the output shaft 2 of the engine 1. Thereby, the torque of the engine 1 is transmitted to the tire 10 through the gear 4 on the engine side for low speed and the gear 31 on the motor side for low speed. One example of the running of the system shown in FIG. 6 will be explained hereinafter with reference to FIG. 9. In FIG. 9, the axis of abscissa indicates the time, and the axis of ordinate indicates the shift lever position Ii, the accelerator pedal angle α, the brake pedal force β, the motor torque Tm, the engine torque Te, the drive shaft torque To, the vehicle speed Vsp, the engine speed Ne, step number Sn1 of the stepping motor (1), step number Sn2 of the stepping motor (2), and the generator speed Ng. The running conditions are the case where the accelerator pedal angle α is changed during running at constant vehicle speed. When the accelerator pedal angle α is greatly applied (e), the target drive shaft torque Ttar increases. Therefore, it is necessary to increase the motor torque Tm and output the engine torque Te. Since at that time, the engine 1 and the generator 15 are integrated, the output shaft 2 of the engine 1 is adjusted to the speed (speed of the motor 29) of the gear 4 on the engine side for low speed by the generator 15, the stepping motor (2) is rotated to the positive side (right rotation: movement leftward of the rack 11) at f, and the sleeve 8 is meshed with the meshing gear 3 of the gear 4 on the engine side for low speed. Thereby, the parallel mode is enabled by addition of the smooth engine torque Te. When the accelerator pedal angle α lowers (g), only the engine torque Te is set to zero, and running is effected by only the motor torque Tm. At this time, the shift caused by the movement of the sleeve 8 is not carried out in terms of reduction in shock at the time of deceleration.

Figure 7:
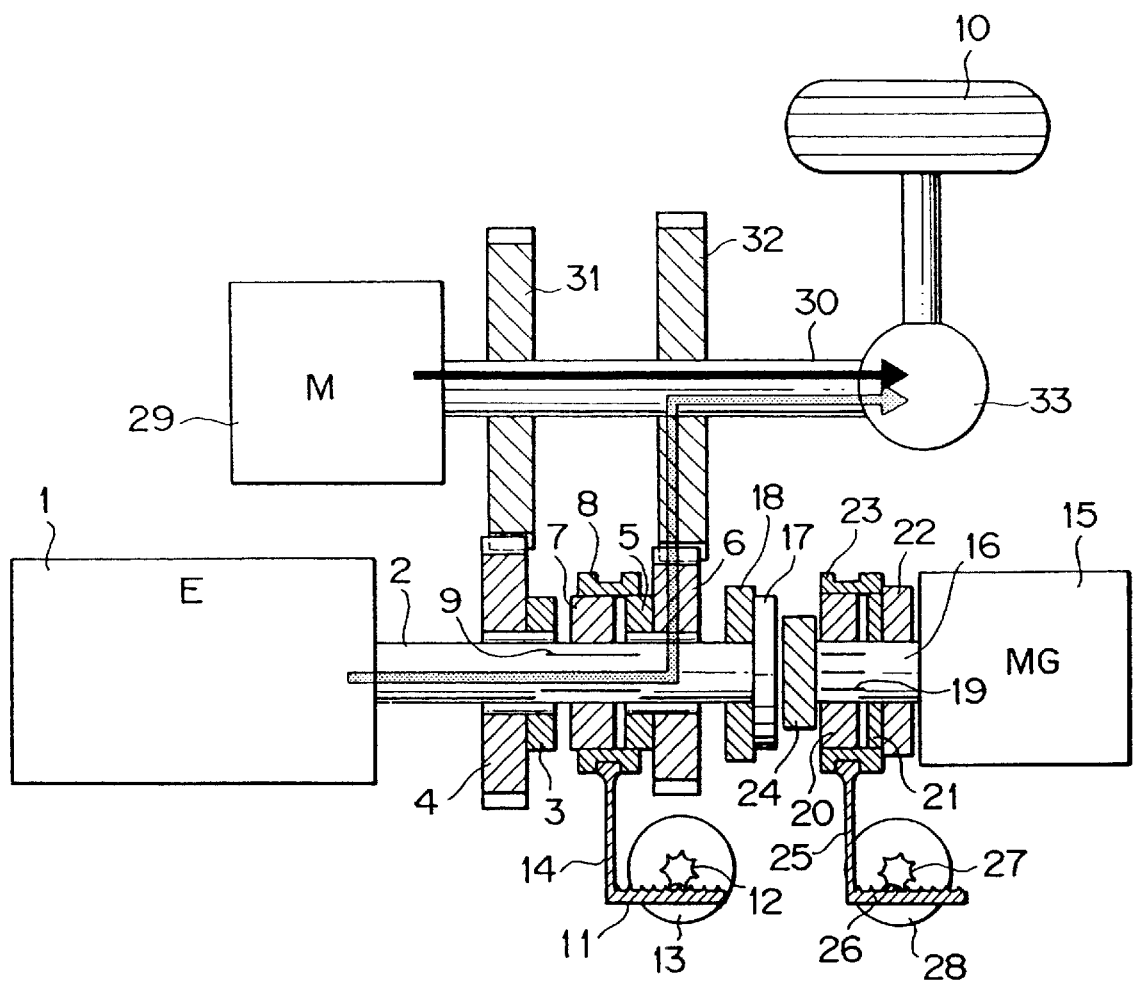
FIG. 7 shows a system constitutional view in a parallel mode at high speed of FIG. 1.

FIG. 7 shows a parallel mode at the time of high speed. Here, the stepping motor (1) 13 is rotated leftward, the rack 11 is moved rightward, and the sleeve 8 is set to the meshing gear 5 provided on the gear 6 on the engine side for high speed. The stepping motor (2) 28 is rotated leftward, the rack 26 is moved rightward, and the sleeve 23 is disengaged from the output shaft 2 of the engine 1. Thereby, the torque of the engine 1 is transmitted to the tire 10 through the gear 6 on the engine side for high speed and the gear 32 on the motor side for high speed. At acceleration, the generator 15 is disengaged from the output shaft 2 and a torque corresponding to an inertia torque of the generator can be reduced. Therefore, it is not necessary to increase the torque of the engine 1 to improve fuel economy at acceleration. One example of the running of the system shown in FIG. 7 will be explained hereinafter with reference to FIG. 10. In FIG. 10, the axis of abscissa indicates the time, and the axis of ordinate indicates the shift command Ss, the accelerator pedal angle α, the brake pedal force β, the motor torque Tm, the engine torque Te, the generator torque Tg, the drive shaft torque To, the vehicle speed Vsp, the engine speed Ne, step number Sn1 of the stepping motor (1), and step number Sn2 of the stepping motor (2). The running conditions are the case where the shift command Ss is changed during running at constant accelerator pedal angle α. After the shift command Ss has been changed (h), the shift is made by movement of the sleeve 8. Therefore, the engine torque Te and the generator torque Tg are increased temporaly, the step number Sn1 of the stepping motor (1) is set to negative, and the shift of the gear 6 on the engine side for high speed is executed. This is because of the fact that when torque occurs at the sleeve 8, the movement of the sleeve 8 is difficult. Since at the time of shift, the torque from the engine 1 lowers, the torque Tm of the motor 29 is increased disregarding the fuel cost to prevent the torque from being lowered. The frequency of increase in the motor torque Tm is merely during the shift, not leading to an increase in fuel cost.

Figure 11:
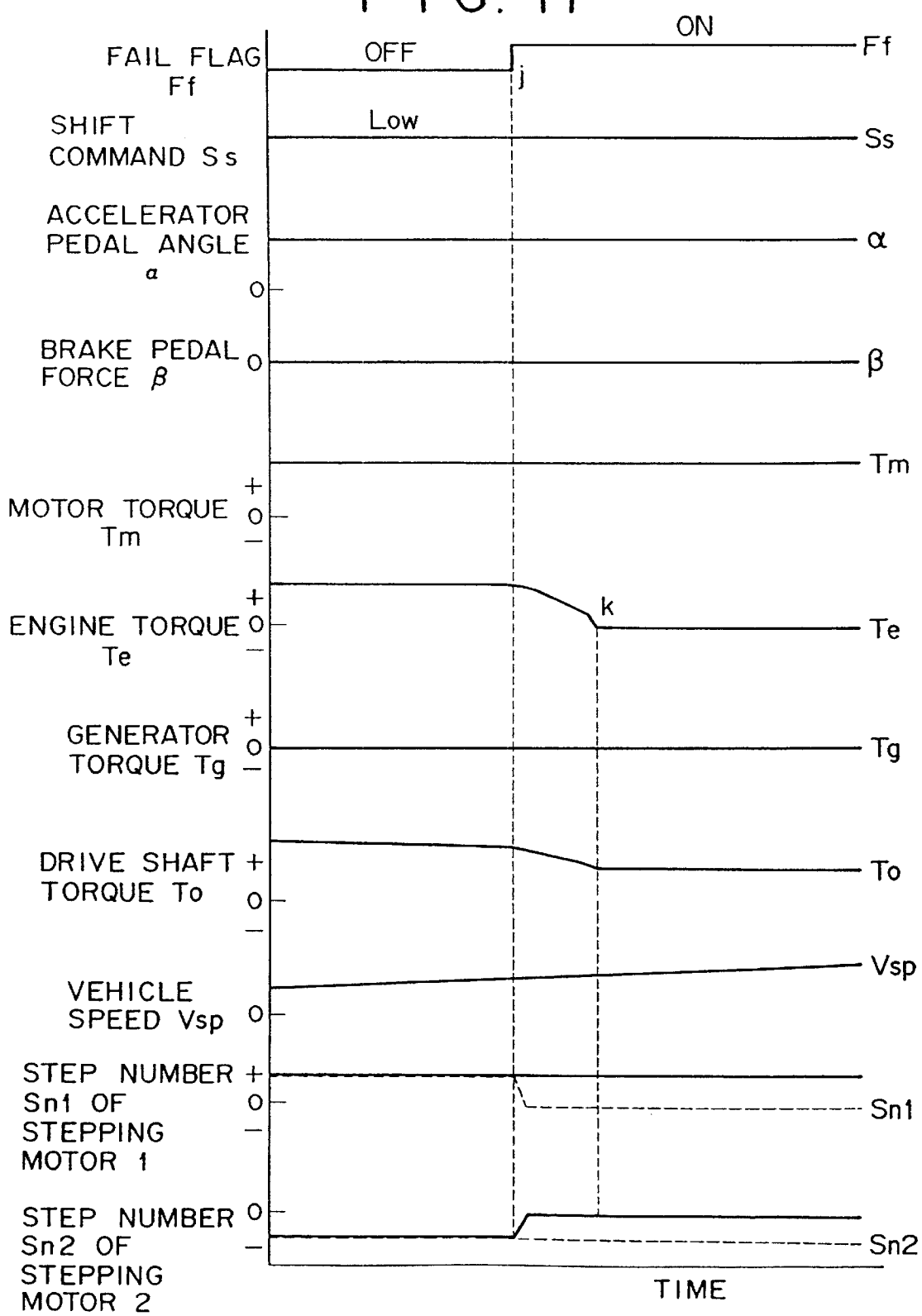
FIG. 11 shows a time chart at the time of trouble of an actuator of FIG. 1.

FIG. 11 is a time chart when an actuator is in trouble. In FIG. 11, the axis of abscissa indicates the time, and the axis of ordinate indicates a fail-safe flag Ff, the shift command Ss, the accelerator pedal angle α, the brake pedal force β, the motor torque Tm, the engine torque Te, the generator torque Tg, the drive shaft torque To, the vehicle speed Vsp, step number Sn1 of the stepping motor (1), and step number Sn2 of the stepping motor (2). The fail conditions are the case where the stepping motor (1) is not actuated, and the gear 4 on the engine side for low speed is fixed. In the case where the fail is judged by the power train control unit 41 (j), running by the motor 29 and the generator 15 should be executed to avoid a danger, and an input from the engine 1 is cutoff. Thereby, the engine torque Te is smoothly set to zero from j to k to reduce the shock, and the step number Sn2 of the stepping motor (2) is returned to zero, and the generator 15 is set to be used as a motor. In the case where as the fail condition, the stepping motor (2) is fixed to the output shaft 16 of the generator 15 as shown by the diagonal line, the engine torque Te is likewise smoothly set from j to k to reduce the shock, and the step number Sn2 of the stepping motor (1) is returned to zero to set the shift position to a neutral point. Thereby, running only by the motor 29 results, and it is possible to suppress the shock to impart an operator unpleasant feeling and avoid a danger.

FIG. 12 shows an example in which a wobble motor is applied to a linear actuator. In the case of the system as described above, since the frequency of shift is small, when energy of the dog clutch in the operation other than the shift is not present, the power consumption can be reduced, and the fuel economy can be improved. So, a linear actuator shown in FIG. 12 was applied. The sleeve 8 is provided with a lever 52 for movement of the sleeve 8. A member 54 for supporting a ball 53 is mounted on the lever 52, the ball being constituted so as not to transmit rotation of a screw 56 to the lever 52. The screw 56 is rotated by power supplied to a stator 55 to effect linear motion. Due to the linear motion of the screw 56, the lever 52 and the sleeve 8 move so that the shift or the like is executed. The linear actuator is not moved because the screw 56 is engaged with the thread portion of the stator 55 with respect to reaction from the sleeve 8, and energy (power) when the sleeve 8 is fixed is not necessary. A motor comprising the screw 56 and the stator 56 is called a wobble motor.

According to the present embodiment, there is provided a power transmission apparatus for an automobile comprising a generator driven by an output of the engine, a battery charged by generation output of the generator, and a motor driven by discharge output of the battery, wherein a clutch mechanism is provided between the output shaft of the engine and an output shaft of the generator whereby an occurrence of inertial torque of the generator can be suppressed. Thereby, it is not necessary to correct the inertial torque caused by the engine or the motor, thus enabling a considerable reduction in fuel cost at the time of acceleration of the vehicle.

What is claimed is:

1. A power transmission apparatus for an automobile having a mechanism in which a rotational force of an internal combustion engine and a rotational force of an electric motor are synthesized or selectively switched to drive a drive wheel, the rotational force of said internal combustion engine or said drive wheel being convertible by a generator into electric power for being supplied to said electric motor, comprising:

a mechanism configured to disconnect said generator from a rotational force transmission system comprised of said internal combustion engine and said drive wheel;

wherein the rotational force transmission system has a mechanism for switching a first transmission system having a first speed change ratio to or from a second transmission system having a second speed change ratio such that, with rotation transmitted by said first transmission system, the rotational force transmission system is disconnected from said generator and, with rotation transmitted by said second transmission system, the rotational force transmission system is connected to said generator.

2. A power transmission apparatus for an automobile having a mechanism in which a rotational force of an internal combustion engine and a rotational force of an electric motor are synthesized or selectively switched to drive a drive wheel, the rotational force of said internal combustion engine or said drive wheel being convertible by a generator into electric power for being supplied to said electric motor, comprising:

a mechanism configured to disconnect said generator from a rotational force transmission system comprised of said internal combustion engine and said drive wheel;

wherein the rotational force transmission system has a mechanism for switching a first transmission system having a first speed change ratio, a second transmission system having a second speed change ratio and a neutral state for disconnecting the rotational force transmission system; such that with rotation transmitted by said first transmission system, the rotational force transmission system is disconnected from said generator; and with rotation transmitted by said second transmission system and rotation in said neutral state, the rotational force transmission system is connected to said generator.

3. A power transmission device for an automobile according to claim 1, further comprising:

means for holding at least one of a changing-over mechanism for changing over said rotational force transmission system, said mechanism for disconnecting said generator and a mechanism for disconnecting said electric motor at a predetermined state;

wherein said holding means is operative to hold either said changing-over mechanism or said disconnecting mechanism at a predetermined state with only a mechanical reaction force.

4. A power transmission device for an automobile according to claim 3, wherein means for holding said mechanism at a predetermined state is a wobble motor.

* * * * *